(12) United States Patent
Bertocci et al.

(10) Patent No.: US 12,250,317 B2
(45) Date of Patent: Mar. 11, 2025

(54) PASSKEY INTEGRATION TECHNIQUES FOR IDENTITY MANAGEMENT

(71) Applicant: Okta, Inc., San Francisco, CA (US)

(72) Inventors: Vittorio Luigi Bertocci, Redmond, WA (US); Matias Woloski, Punta del Este (UY); Sebastian Iacomuzzi, London (GB); Ankur Priyadarshi Chauhan, Vallauris (FR)

(*) Notice: Subject to any disclaimer, the term of this patent is extended or adjusted under 35 U.S.C. 154(b) by 211 days.

(21) Appl. No.: 17/821,748

(22) Filed: Aug. 23, 2022

(65) Prior Publication Data

US 2024/0073024 A1    Feb. 29, 2024

(51) Int. Cl.
  *H04L 9/32* (2006.01)
  *H04L 9/30* (2006.01)
  *H04L 9/40* (2022.01)

(52) U.S. Cl.
  CPC .............. *H04L 9/3226* (2013.01); *H04L 9/30* (2013.01); *H04L 9/3247* (2013.01); *H04L 9/3271* (2013.01); *H04L 63/20* (2013.01)

(58) Field of Classification Search
  CPC ....... H04L 9/3226; H04L 9/30; H04L 9/3247; H04L 9/3271; H04L 63/20; H04L 63/083
  See application file for complete search history.

(56) References Cited

U.S. PATENT DOCUMENTS

| 8,719,952 | B1 * | 5/2014 | Damm-Goossens | ........................ H04L 9/3226 726/28 |
| 2002/0083192 | A1 | 6/2002 | Alisuag | |
| 2006/0026671 | A1 * | 2/2006 | Potter | .................... H04L 63/205 726/7 |
| 2011/0314304 | A1 * | 12/2011 | Braams | ................... G06F 21/78 713/193 |

(Continued)

FOREIGN PATENT DOCUMENTS

| JP | 2008167107 A * | 7/2008 |
| WO | 2020/142788 A1 | 7/2020 |

OTHER PUBLICATIONS

"International Search Report and Written Opinion of the International Searching Authority," issued in connection with Int'l Appl. No. PCT/US2023/029896, dated Nov. 27, 2023 (13 pages).

*Primary Examiner* — Robert B Leung
(74) *Attorney, Agent, or Firm* — Holland & Hart LLP

(57) ABSTRACT

Methods, systems, devices, and apparatuses for passkey authentication at an identity management platform are described. In accordance with the described techniques, an administrator of the identity management platform may enable passkey authentication for clients of the identity management platform. Once the passkey authentication is enabled, the identity management platform may display a passkey login option to users associated with the clients of the identity management platform. If a user associated with (Continued)

a client of the identity management platform selects the passkey login option, a device associated with the user may generate a passkey that includes a private key and a public key. The device may store the private key and transmit an indication of the public key to the identity management platform. The identity management platform may use the public key to verify the identity of the user in subsequent login attempts.

17 Claims, 10 Drawing Sheets

(56) References Cited

U.S. PATENT DOCUMENTS

| | | | |
|---|---|---|---|
| 2015/0326402 A1* | 11/2015 | Sibert | H04L 63/08 |
| | | | 726/6 |
| 2017/0339127 A1 | 11/2017 | Maiti | |
| 2018/0212785 A1 | 7/2018 | Peddada et al. | |
| 2020/0021448 A1* | 1/2020 | Chumbley | H04L 63/0884 |
| 2020/0034160 A1* | 1/2020 | Koren | H04L 63/0815 |
| 2021/0081154 A1* | 3/2021 | Yasuda | G06F 21/31 |

* cited by examiner

PASSKEY INTEGRATION TECHNIQUES FOR IDENTITY MANAGEMENT

FIELD OF TECHNOLOGY

The present disclosure relates generally to user authentication, and more specifically to passkey integration techniques for identity management.

BACKGROUND

A user may be prompted to enter identifying information (e.g., username and password) after navigating to a login page of a software application. Users that have accounts with different services, applications, and websites may be required to remember a prohibitive number of usernames, passwords, account numbers, etc. Logging into each application may impose a considerable burden on a user, as the user is often require to manually enter a username and corresponding password for each login attempt.

In some cases, an application may use a software platform to manage login processes. The software platform may store or otherwise maintain a record of credentials and other information used to access software applications. In some cases, however, conventional information management techniques may be improved.

SUMMARY

The described techniques relate to improved methods, systems, devices, and apparatuses for enabling passkey authentication at an identity management platform. In accordance with one or more aspects of the present disclosure, an identity management platform may receive an indication to enable passkey authentication for clients of the identity management platform. The indication may be received from an administrator or developer of the identity management platform via a first user interface configured for the identity management platform. Once passkey authentication is enabled, the identity management platform may display a passkey login option to a user associated with a client of the identity management platform. The passkey login option may be displayed via a second user interface configured for the client of the identity management platform. If the user selects the passkey login option, the identity management platform may obtain a public key for the user and use the public key to validate an identity of the user in subsequent login attempts.

A method for passkey authentication at an identity management platform is described. The method may include receiving, from an administrator of the identity management platform via a first user interface configured for the identity management platform, an indication to enable passkey authentication for clients of the identity management platform. The method may further include transmitting, for display at a second user interface configured for a client of the identity management platform and based on enabling the passkey authentication, an option to use the passkey authentication for login procedures. The method may further include receiving, from a user associated with the client via the second user interface, a selection of the option to use the passkey authentication for a login procedure. The method may further include obtaining a public key for the user in response to the user selecting the option to use the passkey authentication for the login procedure. The method may further include performing the login procedure using at least the public key to authenticate an identity of the user.

An apparatus for passkey authentication at an identity management platform is described. The apparatus may include a processor, memory coupled with the processor, and instructions stored in the memory. The instructions may be executable by the processor to cause the apparatus to receive, from an administrator of the identity management platform via a first user interface configured for the identity management platform, an indication to enable passkey authentication for clients of the identity management platform. The instructions may be further executable by the processor to cause the apparatus to transmit, for display at a second user interface configured for a client of the identity management platform and based on enabling the passkey authentication, an option to use the passkey authentication for login procedures. The instructions may be further executable by the processor to cause the apparatus to receive, from a user associated with the client via the second user interface, a selection of the option to use the passkey authentication for a login procedure, obtain a public key for the user in response to the user selecting the option to use the passkey authentication for the login procedure. The instructions may be further executable by the processor to cause the apparatus to perform the login procedure using at least the public key to authenticate an identity of the user.

Another apparatus for passkey authentication at an identity management platform is described. The apparatus may include means for receiving, from an administrator of the identity management platform via a first user interface configured for the identity management platform, an indication to enable passkey authentication for clients of the identity management platform. The apparatus may further include means for transmitting, for display at a second user interface configured for a client of the identity management platform and based on enabling the passkey authentication, an option to use the passkey authentication for login procedures. The apparatus may further include means for receiving, from a user associated with the client via the second user interface, a selection of the option to use the passkey authentication for a login procedure. The apparatus may further include means for obtaining a public key for the user in response to the user selecting the option to use the passkey authentication for the login procedure. The apparatus may further include means for performing the login procedure using at least the public key to authenticate an identity of the user.

A non-transitory computer-readable medium storing code for passkey authentication at an identity management platform is described. The code may include instructions executable by a processor to receive, from an administrator of the identity management platform via a first user interface configured for the identity management platform, an indication to enable passkey authentication for clients of the identity management platform. The instructions may be further executable by the processor to transmit, for display at a second user interface configured for a client of the identity management platform and based on enabling the passkey authentication, an option to use the passkey authentication for login procedures. The instructions may be further executable by the processor to receive, from a user associated with the client via the second user interface, a selection of the option to use the passkey authentication for a login procedure. The instructions may be further executable by the processor to obtain a public key for the user in response to the user selecting the option to use the passkey authentication for the login procedure. The instructions may be further executable by the processor to perform the login procedure using at least the public key to authenticate an identity of the user.

In some examples of the methods, apparatuses, and non-transitory computer-readable media described herein, performing the login procedure may include operations, features, means, or instructions for transmitting an indication of a cryptographic challenge to a device associated with the user.

In some examples of the methods, apparatuses, and non-transitory computer-readable media described herein, performing the login procedure may include operations, features, means, or instructions for receiving an indication of a cryptographic response from the device in response to the cryptographic challenge, where the cryptographic response includes a digital signature.

In some examples of the methods, apparatuses, and non-transitory computer-readable media described herein, performing the login procedure may include operations, features, means, or instructions for authenticating the user based on using the public key to verify the digital signature in the cryptographic response.

Some examples of the methods, apparatuses, and non-transitory computer-readable media described herein may further include operations, features, means, or instructions for determining that the device has access to a private key associated with the user based on the digital signature in the cryptographic response, where authenticating the user is based on determining that the device has access to the private key.

In some examples of the methods, apparatuses, and non-transitory computer-readable media described herein, the private key may be locally unlocked on the device after the user successfully performs a facial recognition procedure, a voice recognition procedure, a fingerprint recognition procedure, a personal identification number verification procedure, a security key verification procedure, or a combination thereof.

In some examples of the methods, apparatuses, and non-transitory computer-readable media described herein, the private key may be generated and stored at the device after the user selects the option to use the passkey authentication for the login procedure.

Some examples of the methods, apparatuses, and non-transitory computer-readable media described herein may further include operations, features, means, or instructions for receiving an indication that the user has registered the public key with the client of the identity management platform, where obtaining the public key for the user is based on the indication.

In some examples of the methods, apparatuses, and non-transitory computer-readable media described herein, receiving the selection of the option to use the passkey authentication may include operations, features, means, or instructions for receiving the selection via a web browser executing on a device associated with the user, where the public key of the user is stored at the identity management platform in association with the user, the web browser, the device, an operating system of the device, or a combination thereof.

Some examples of the methods, apparatuses, and non-transitory computer-readable media described herein may further include operations, features, means, or instructions for receiving, via a web browser executing on a device associated with the user, an indication of capability information associated with the device.

Some examples of the methods, apparatuses, and non-transitory computer-readable media described herein may further include operations, features, means, or instructions for determining that the device supports the passkey authentication based on the capability information, where displaying the option to use the passkey authentication for the login procedure is based on determining that the device supports the passkey authentication.

In some examples of the methods, apparatuses, and non-transitory computer-readable media described herein, the capability information may be received via a web browser executing on the device of the user.

Some examples of the methods, apparatuses, and non-transitory computer-readable media described herein may further include operations, features, means, or instructions for storing the public key at the identity management platform in association with an identifier of the user, a password of the user, an account number associated with the user, or a combination thereof, where the public key is retrieved from the identity management platform after the user initiates the login procedure.

In some examples of the methods, apparatuses, and non-transitory computer-readable media described herein, receiving the indication to enable the passkey authentication may include operations, features, or instructions for enabling the passkey authentication for the clients of the identity management platform in response to the administrator of the identity management platform selecting one or more user interface elements displayed in the first user interface.

In some examples of the methods, apparatuses, and non-transitory computer-readable media described herein, the one or more user interface elements include a checkbox, a toggle switch, a dropdown list, a button, or a combination thereof.

Some examples of the methods, apparatuses, and non-transitory computer-readable media described herein may further include operations, features, means, or instructions for configuring a passkey for the user based on performing one or more application programming interface (API) calls to a web authentication service, where the passkey includes the public key and a corresponding private key associated with the user.

In some examples of the methods, apparatuses, and non-transitory computer-readable media described herein, displaying the option to use the passkey authentication may include operations, features, means, or instructions for transmitting, for display at the second user interface, a first option to use the passkey authentication for the login procedure and a second option to use other credentials for the login procedure, where the first option is selected by the user.

DETAILED DESCRIPTION

Figure 1:
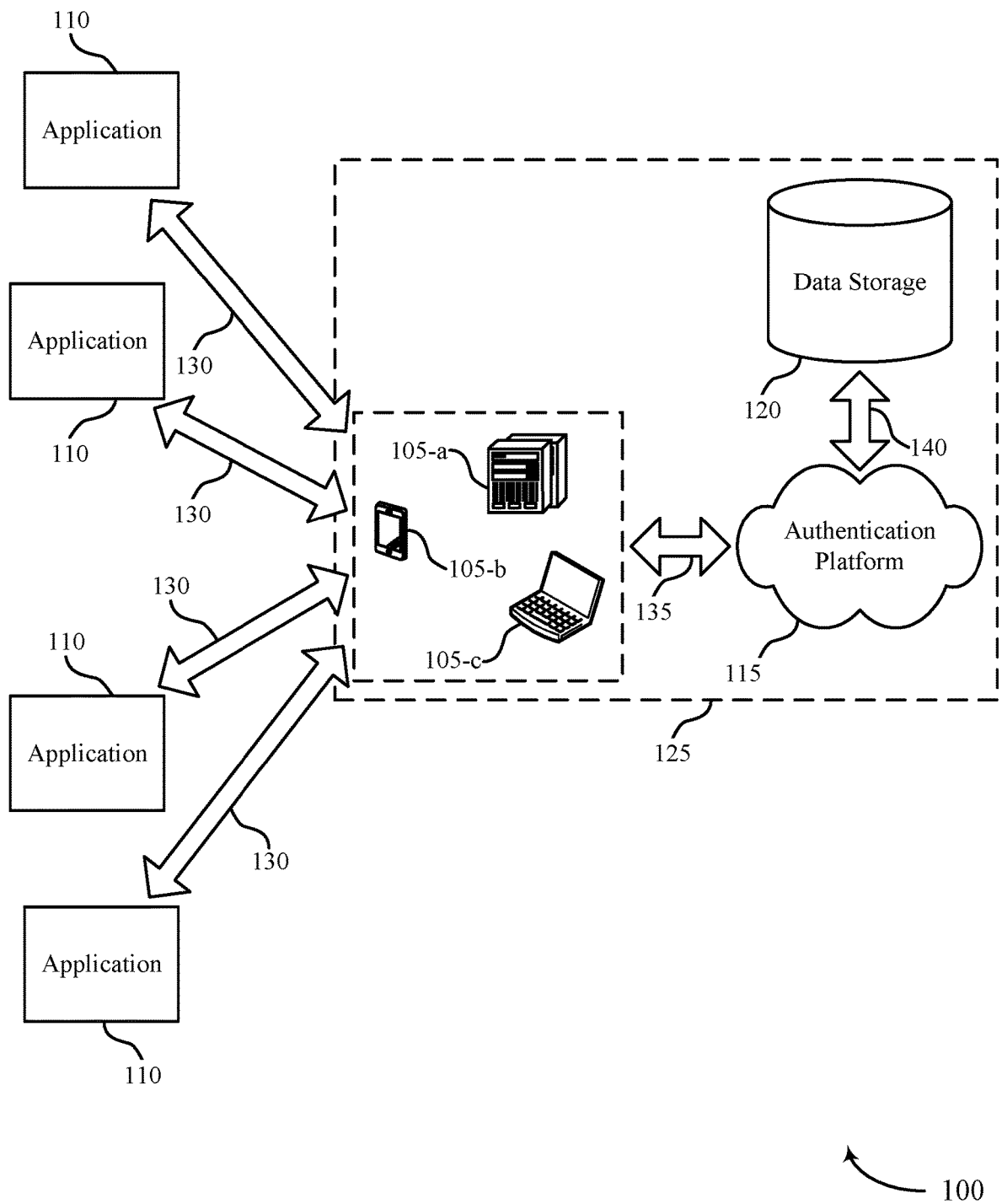
FIGS. 1 and 2 illustrate examples of systems that support passkey integration techniques for identity management in accordance with one or more aspects of the present disclosure.

Some software platforms manage identifying information associated with different users. The identifying information may include personal information (e.g., name, social security number, driver license number), contact information (e.g., home address, telephone number, email address), payment information (e.g., credit card number, bank information), account information (e.g., credentials), or any combination thereof. As described herein, a credential may refer to a username or a password, among other examples. In some examples, the software platform may process a request (e.g., a login request, a network protocol request) from a user associated with a client of the software platform. For example, the software platform may authenticate the user and authorize access to resources associated with the client. In some examples, the software platform may authenticate and authorize the user based on one or more credentials (such as a combination of a username and password) provided by the user.

Users may have login credentials (e.g., usernames and passwords) for a large number of applications, websites, online services, etc. Keeping track of these login credentials while trying to make each password unique may be tedious and inefficient. Using the same login credentials across multiple services may result in higher risk and greater potential exposure (in the event of a data breach). Moreover, user-generated passwords are more predictable and less secure than auto-generated passwords. Passkeys are a more secure and user-friendly alternative to conventional passwords. Passkey authentication schemes use public key encryption techniques to perform identity verification without a user-entered password. In some cases, however, passkey integration mechanisms may be static, and users may be unable to choose between passkey authentication and other login mechanisms.

Aspects of the present disclosure support techniques for enabling and integrating dynamic passkey authentication for clients of an identity management platform. In accordance with the described techniques, an administrator or developer of an identity management platform (equivalently referred to herein as a software platform) may enable passkey authentication for the clients of the identity management platform. Once passkey authentication is enabled, the identity management platform may display a passkey login option to users associated with the clients of the identity management platform. For example, if a user navigates to a login page associated with a client of the identity management platform, the user may be presented with a first option to log in using passkey authentication and a second option to log in using a username, password, account number, etc. If the user chooses to use passkey authentication (by clicking or otherwise interacting with one or more user interface elements), the identity management platform may configure a passkey for the user and utilize the passkey to verify the identity of the user in subsequent login attempts.

In some examples, the identity management platform may configure the passkey for the user by invoking a web authentication application programming interface (API). For example, a web browser executing on a device associated with the user may perform one or more API calls to the web authentication API (after the user selects the passkey login option) to configure the passkey. As described herein, the passkey may include a public key and a private key. The private key may be stored (and locally unlocked) on the device associated with the user, while the public key may be conveyed to the identity management platform (via the web browser). The identity management platform may store the public key in association with other credentials of the user (password, email, username), and may use the public key to verify subsequent login attempts from the user.

Aspects of the present disclosure may be implemented to realize one or more of the following advantages. The described techniques may enable an identity management platform to provide passkey authentication services to clients and end users, which may improve the security and efficiency of login procedures between the clients and the end users. For example, if passkey authentication is enabled for a client of the identity management platform, users associated with the client may be presented with an option to login using a passkey or other suitable credentials (upon navigating to a login page associated with the client). If the user selects this option, a passkey may be automatically generated and stored on a device associated with the user. In subsequent login attempts, the user can unlock this passkey via biometric verification processes (fingerprint recognition, facial recognition, voice recognition) or other local authentication mechanisms. Once the passkey is unlocked (and used to complete the login process), the user can access client resources without manually entering a username and password, which may result in greater efficiency and higher user satisfaction, among other benefits.

Aspects of the disclosure are initially described in the context of systems and process flows. Aspects of the disclosure are further illustrated by and described with reference to apparatus diagrams, system diagrams, and flowcharts that relate to passkey integration techniques for identity management.

FIG. 1 illustrates an example of a computing environment 100 that supports passkey integration techniques for identity management in accordance with various aspects of the present disclosure. The computing environment 100 includes client devices 105, applications 110, authentication platform 115, and data storage 120. Authentication platform 115 may be an example of a public or private cloud network. A client device 105 may access authentication platform 115 over network connection 135. The network may implement transmission control protocol and internet protocol (TCP/IP), such as the Internet, or may implement other network protocols. A client device 105 may be an example of a user device, such as a server (e.g., client device 105-*a*), a smartphone (e.g., client device 105-*b*), or a laptop (e.g., client device 105-*c*). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110 via one or more interactions 130. The interactions 130 may include digital communications, API calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some examples, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a compute cluster, or any other type of computing system, component, or environment. In some examples, the application 110 may be operated by a user or group of users.

Authentication platform 115 may offer cloud-based services to the client devices 105, the applications 110, or both. In some cases, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some examples, authentication platform 115 may receive data directly from an interaction 130 between an application 110 and the client device 105. In some examples, the client device 105 may develop applications to run on authentication platform 115. Authentication platform 115 may be implemented using remote servers. In some examples, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations. Subsystem 125 may include client devices 105, authentication platform 115, and data storage 120. In some examples, data processing may occur at any of the components of subsystem 125, or at a combination of these components. In some examples, servers may perform the data processing. The servers may be a client device 105 or located at data storage 120.

As described herein, the authentication platform 115 (equivalently referred to herein as an identity management platform) may receive an indication that a developer or administrative user of the authentication platform 115 has enabled passkey authentication for client devices 105 supported by the authentication platform 115. Accordingly, the authentication platform 115 may transmit an indication of a passkey login option for display at applications 110 (e.g., web browsers executing on user devices) associated with the client devices 105. If, for example, the authentication platform 115 receives an indication that an application 110 associated with a client device 105 has selected the passkey login option, the authentication platform 115 may prompt the application 110 to generate a passkey (via one or more API calls to a web authentication service). The application 110 may use the passkey to login and access resources provided by the client device 105.

Aspects of the computing environment 100 may be implemented to realize one or more of the following advantages. The techniques described with reference to FIG. 1 may enable developers or administrators of the authentication platform 115 to dynamically configure passkey authentication for clients of the authentication platform 115 via one or more user interface elements. For example, an administrator of the authentication platform 115 may enable (or disable) passkey authentication for clients of the authentication platform by interacting with a button, toggle switch, checkbox, etc. Thus, in comparison to other (static, hard-coded) passkey integration schemes, the techniques described herein may provide developers with a flexible, user-friendly passkey integration mechanism. Moreover, providing passkey authentication services to clients of the authentication platform 115 may enable end users of the authentication platform 115 to access client resources with greater security and reduced manual interaction, among other benefits.

It should be appreciated by a person skilled in the art that one or more aspects of the computing environment 100 may be implemented to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
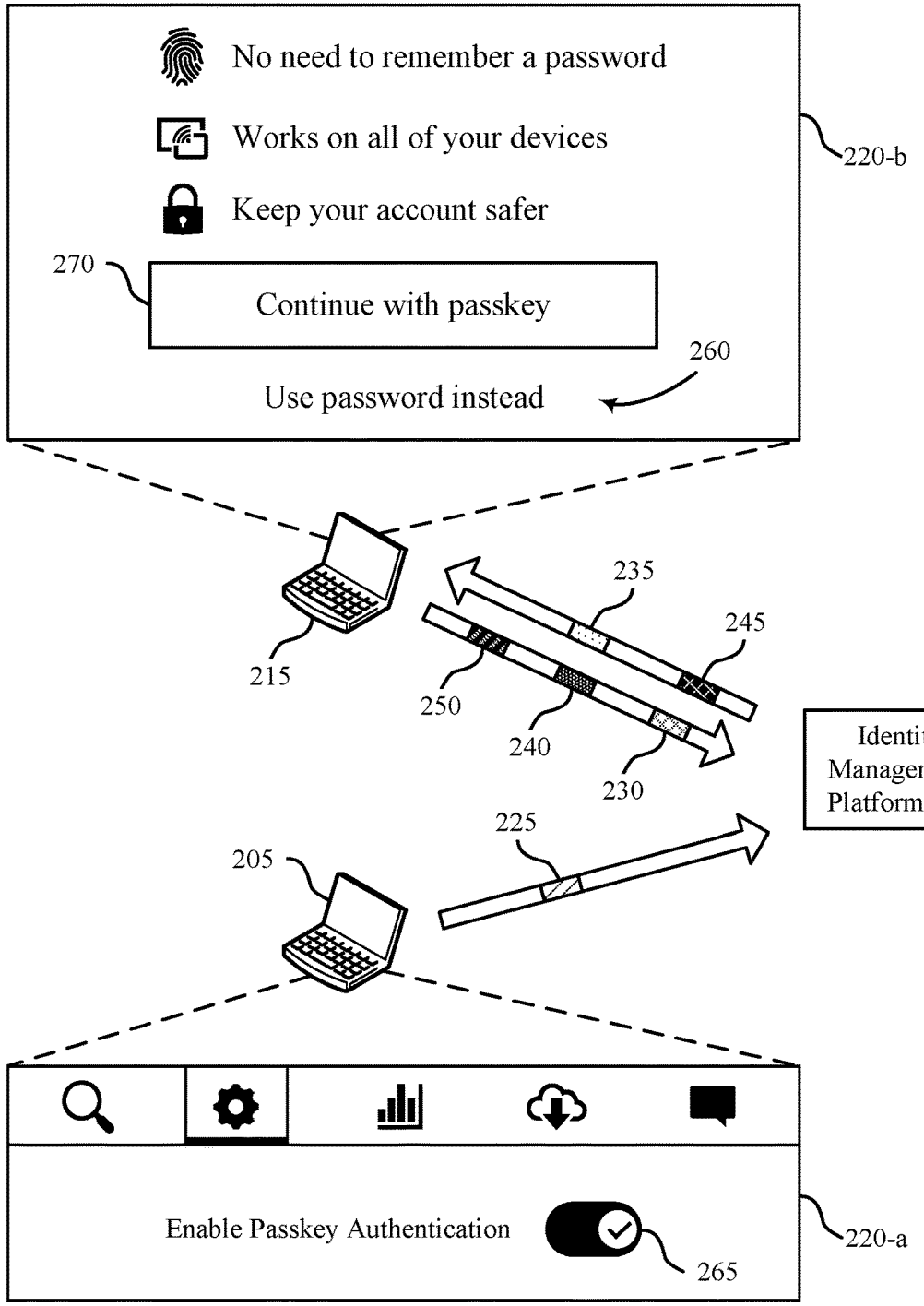

FIG. 2 illustrates an example of a computing environment 200 that supports passkey integration techniques for identity management in accordance with one or more aspects of the present disclosure. The computing environment 200 may implement or be implemented by aspects of the computing environment 100. For example, the computing environment 200 may include an identity management platform 210, which may be an example of the authentication platform 115 described with reference to FIG. 1. The computing environment 200 may also include a device 205 and a device 215, which may communicate or otherwise exchange information with the identity management platform 210 via one or more user interfaces. The device 205 may be associated with a developer or administrative user of the identity management platform 210, while the device 215 may be associated with an end user of the identity management platform 210 (e.g., a user associated with a client of the identity management platform 210). In the computing environment 200, the identity management platform 210 may display an option to use passkey authentication at the device 215.

In the example of FIG. 2, the identity management platform 210 may receive a user input 225 from the device 205. More specifically, the identity management platform 210 may receive the user input 225 from an administrative user via a web browser executing on the device 205. The device 205 may transmit the user input 225 responsive to the administrative user clicking or otherwise interacting with a user interface element 265 displayed in the user interface 220-a. The identity management platform 210 may enable passkey authentication for one or more clients of the identity management platform 210 (e.g., the client devices 105 described with reference to FIG. 1) in response to the user input 225 from the device 205.

If passkey authentication is enabled and the device 215 navigates to a login page associated with a client of the identity management platform 210, the device 215 may receive display information 235 from the identity management platform 210. The display information 235 may include instructions for rendering or otherwise displaying a user interface 220-b at the device 215. As illustrated in the example of FIG. 2, the user interface 220-b may include an option 270 to login using a passkey and an option 260 to login using other credentials (username, email, password). In some examples, the identity management platform 210 may determine whether to display the option 270 based on capability information 230 provided by the device 215. For example, if the capability information 230 indicates that the device 215 supports passkey authentication, the identity management platform 210 may display the option 270 in the user interface 220-b. Otherwise, the option 270 may be omitted from the user interface 220-b.

If the end user selects the option 270 to use passkey authentication by clicking or otherwise selecting one or more user interface elements displayed in the user interface 220-b, a user input 240 may be sent from the device 215 to the identity management platform 210. Accordingly, the identity management platform 210 may invoke an API to assist with passkey generation at the device 215. For example, a web browser executing on the device 215 may perform one or more calls to an external API to generate a secure passkey that includes a private key and a public key. The device 215 may store the private key (in association with the login page of the client) and transmit an indication of the public key to the identity management platform 210. Accordingly, the identity management platform 210 may store the public key in association with other credentials (username, password, account number) of the end user such that the public key can be used (in addition to or as an alternative to other credentials) to verify the identity of the end user.

Once the identity management platform 210 has access to the public key generated by the device 215, the identity management platform 210 may retrieve the public key when the device 215 attempts to login again. To initiate a passkey-based login procedure, the identity management platform 210 may transmit a cryptographic challenge 245 to the device 215. The cryptographic challenge 245 may be an example of a string, an integer, a nonce, or the like. In response to the cryptographic challenge 245, the device 215 may prompt the end user to provide some form of biometric information or a pre-authorized security key to unlock the private key stored at the device 215. For example, the device 215 may prompt the end user to perform face recognition, voice recognition, fingerprint recognition, etc.

Once the private key is unlocked, the device 215 may use the private key to sign the cryptographic challenge 245. That is, the device 215 may add (apply) a digital signature to cryptographic challenge 245 using the private key stored at the device 215. Accordingly, the device 215 may transmit an indication of the signed cryptographic challenge to the identity management platform 210 in the form of a cryptographic response 250. The identity management platform 210 may receive the cryptographic response 250 and use the public key (obtained from the device 215) to verify the authenticity of the cryptographic response 250. More specifically, the identity management platform 210 may use the public key to determine whether the cryptographic response 250 was signed using the private key. If the identity management platform 210 determines that the cryptographic response 250 is valid, the identity management platform 210 may authorize the login attempt by the device 215. Otherwise, the identity management platform 210 may deny the login attempt.

Figure 3:
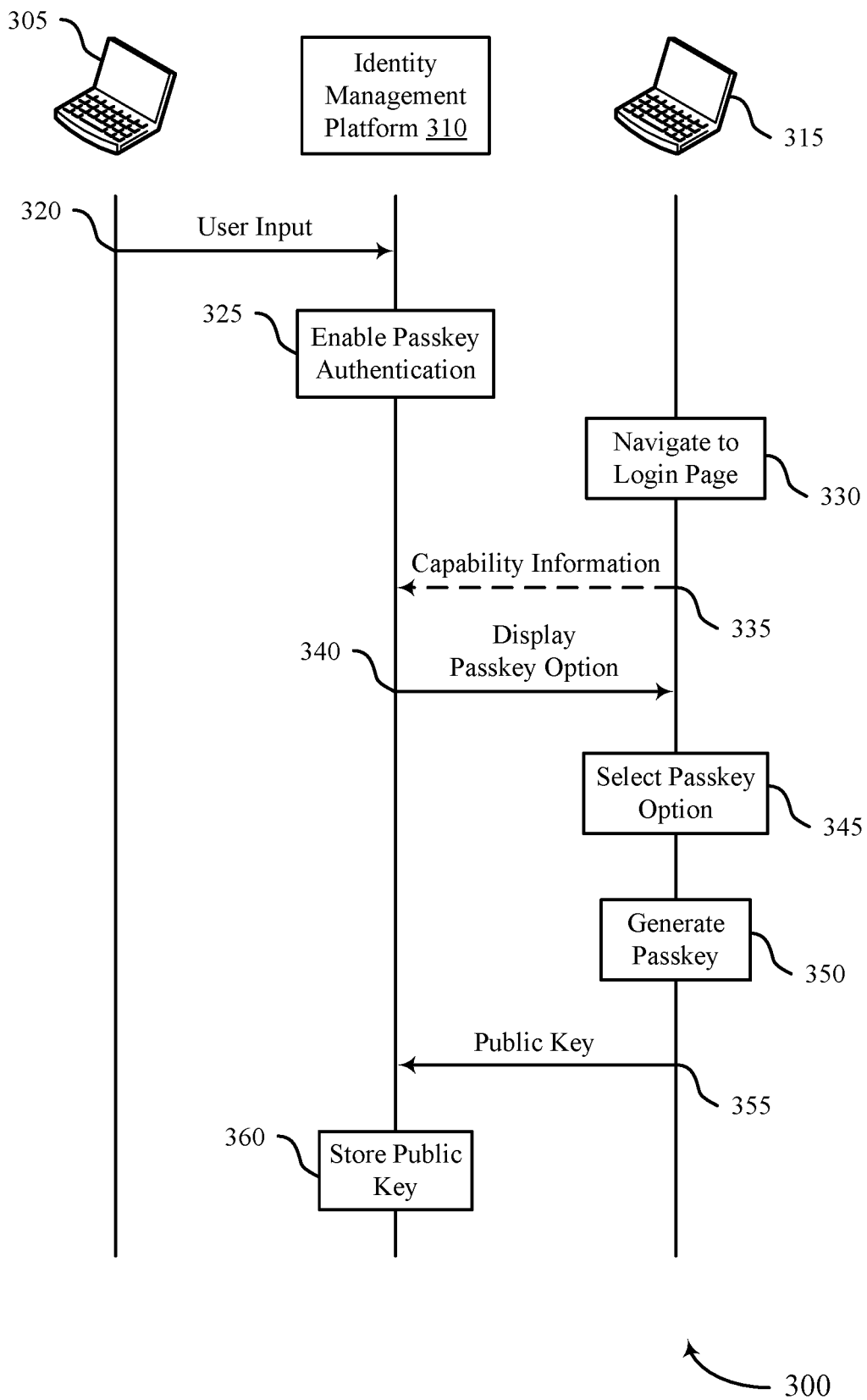
FIGS. 3 and 4 illustrate examples of process flows that support passkey integration techniques for identity management in accordance with one or more aspects of the present disclosure.

FIG. 3 illustrates an example of a process flow 300 that supports passkey integration techniques for identity management in accordance with one or more aspects of the present disclosure. The process flow 300 may implement or be implemented by aspects of the computing environment 100 or the computing environment 200. For example, the process flow 300 may include an identity management platform 310, which may be an example of the identity management platform 210 described with reference to FIG. 2. The process flow 300 may also include a device 305 and a device 315, which may be examples of corresponding devices described herein. In the following description of the process flow 300, operations between the device 305, the identity management platform 310, and the device 315 may be added, omitted, or performed in a different order (with respect to the exemplary order shown).

At 320, the identity management platform 310 may receive a user input from a developer or administrative user of the identity management platform 310 via a web browser executing on the device 305. The user input may indicate a request to enable passkey authentication for clients of the identity management platform 310. In some examples, the identity management platform 310 may receive or detect the user input responsive to the developer or administrator interacting with one or more elements (e.g., the user interface element 265 described with reference to FIG. 2) displayed in a user interface configured for the identity management platform 310. At 325, the identity management platform 310 may enable passkey authentication for clients of the identity management platform 310 based on the user input.

At 330, an end user of the device 315 may navigate to a login page associated with a client of the identity management platform 310. The end user may be an example of a customer or contact associated with the client of the identity management platform 310. At 335, the identity management platform 310 may (in some examples) receive capability information associated with the device 315. The capability information may indicate whether the device 315 supports passkey authentication. At 340, the identity management platform 310 may display an option for the end user to setup and use a passkey. If the end user selects this option at 345, the device 315 may generate a passkey at 350 by making one or more calls to an external API. As described herein, the passkey may include a private key and a public key.

At 355, the device 315 may store the private key (locally) and transmit an indication of the public key to the identity management platform 310. To maintain the secrecy of the locally generated private key, the device 315 may not share the private key with the identity management platform 310 (or any other device). At 360, the identity management platform 310 may store the public key in association with other credentials of the end user (e.g., email, username, account number). In some examples, the identity management platform 310 may have multiple passkeys saved for the end user. For example, if the end user attempts to access the same login page using different devices (smartphone, tablet, desktop) or operating systems, the identity management platform 310 may prompt the end user to create a new passkey, which may be stored in association with a specific device, operating system, web browser, etc.

In some examples, the device 315 may upload or otherwise save the private key to a cloud-based password management application such that the passkey can be used on other devices that have access to the cloud-based password management application. For example, if the end user generates a passkey for a login page using a first device (e.g., a desktop) and then navigates to the same login page on a second device (e.g., a smartphone), the first device may save the passkey to the cloud-based password management application such that the second device can obtain the passkey for the login page (via the cloud-based password management application). As a result, the end user can access the same passkey across different devices, operating systems, web browsers, etc.

Aspects of the process flow 300 may be implemented to realize one or more of the following advantages. The techniques described with reference to FIG. 3 may enable developers or administrative users of the identity management platform 310 to dynamically enable or disable passkey authentication for clients of the identity management platform 310. For example, the described techniques may enable developers of the identity management platform 310 to control whether end users are presented with an option to setup and use a passkey when the end users attempt to access secured resources associated with a client of the identity management platform 310. Moreover, the identity management platform 310 may selectively display the option to devices that are capable of using passkey integration, which may reduce the likelihood of compatibility issues, errors, etc.

Figure 4:
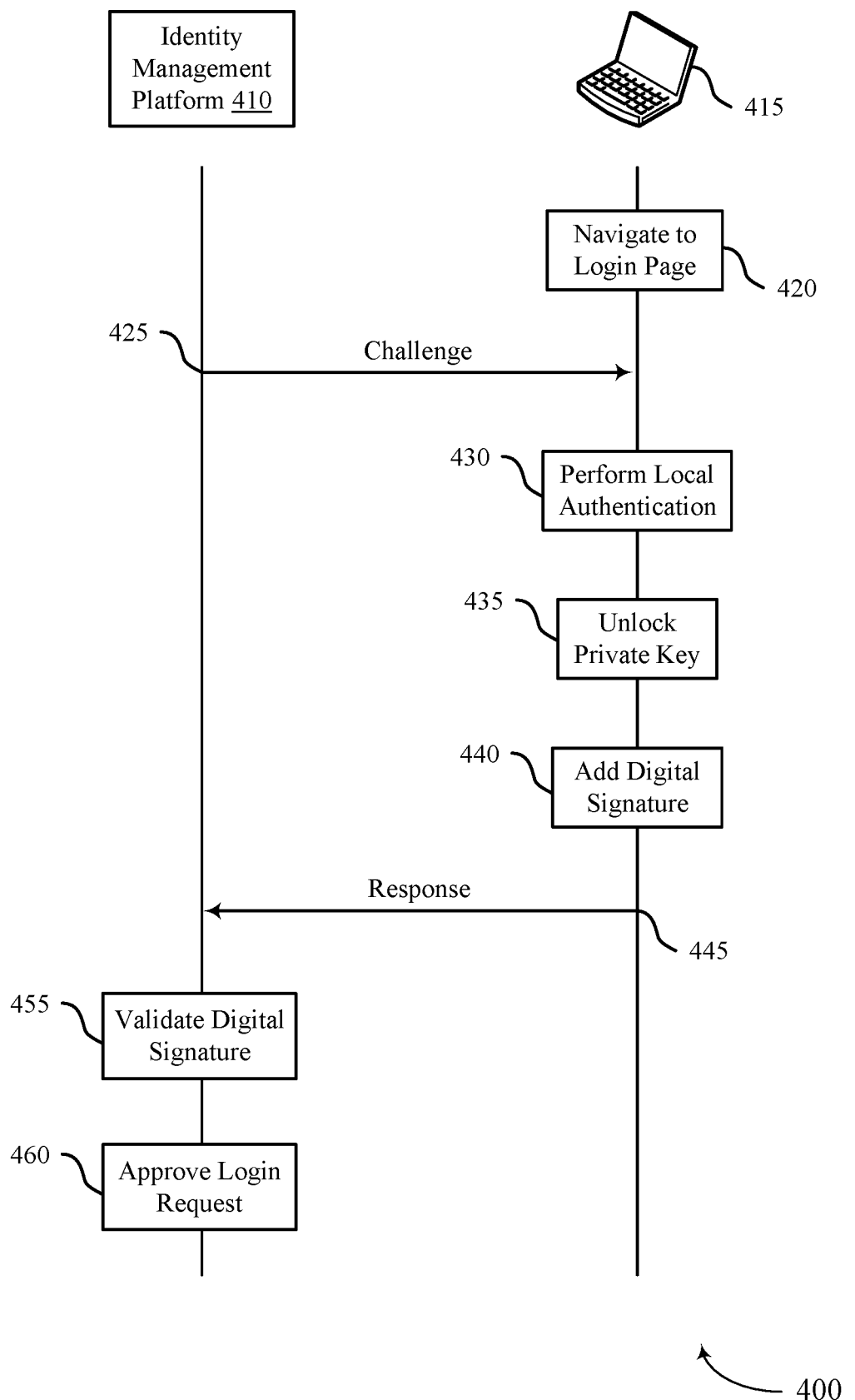

FIG. 4 illustrates an example of a process flow 400 that supports passkey integration techniques for identity management in accordance with one or more aspects of the present disclosure. The process flow 400 may implement or be implemented by aspects of any of the computing environments and process flows described with reference to FIGS. 1 through 3. For example, the process flow 400 may include an identity management platform 410, which may be an example of the identity management platform 210 or the identity management platform 310 described with reference to FIGS. 2 and 3. The process flow 400 may also include a device 415, which may be an example of the device 315 described with reference to FIG. 3. In the following description of the process flow 400, operations between the identity management platform 410 and the device 415 may be added, omitted, or performed in a different order (with respect to the exemplary order shown).

At 420, a user of the device 415 may navigate to a login page associated with a client of the identity management platform 410. The user may be an example of a customer or contact of the client. The user may navigate to the login page via a web browser running on the device 415. The login page may be displayed according to display information provided by one or both of the client or the identity management platform 410. In some examples, the user may be presented with the login page after attempting to access secured or protected resources of the client. The identity management platform 410 may detect the login attempt from the device 415 and retrieve identifying information associated with one or both of the user or the device 415. The identity management platform 410 may retrieve this information based on a device identifier associated with the login attempt, an internet protocol (IP) address of the device 415, etc.

If the identity management platform 410 determines that the user of the device 415 has previously configured and registered a passkey with the client (using the techniques described with reference to FIG. 3), the identity management platform 410 may issue a cryptographic challenge to the device 415 at 425. The cryptographic challenge may be an example of a string, an integer, a nonce, etc. The identity management platform 410 may issue the cryptographic challenge to verify that the device 415 has access to the previously generated passkey. At 430, the device 415 may prompt the user to perform some form of local authentication (such as face recognition or fingerprint recognition) to unlock a private key stored at the device 415. The private key may be an example of a secret cryptographic variable that is used (in combination with an encryption algorithm) to decrypt and encrypt data.

Once the user successfully completes the local authentication procedure (by providing biometric information or some form of a security key), the device 415 may unlock the private key at 435 and use the private key to sign the cryptographic challenge (e.g., the cryptographic challenge 245 described with reference to FIG. 2) at 440. At 445, the device 415 may transmit an indication of the signed cryptographic challenge to the identity management platform 410 in the form of a cryptographic response (e.g., the cryptographic response 250 described with reference to FIG. 2). Hence, the cryptographic response may include a digital signature that is generated using the private key.

At 455, the identity management platform 410 may validate the cryptographic response from the device 415 using a public key stored in association with one or both of the user or the device 415. For example, if the identity management platform 410 determines that the cryptographic response is valid (based on the digital signature in the cryptographic response), the identity management platform 410 may approve the login request at 460 and authorize the device 415 to access the protected resources of the client. Otherwise, if the identity management platform 410 determines that the cryptographic response is invalid, the identity management platform 410 may reject the login request.

Aspects of the process flow 400 may be implemented to realize one or more of the following advantages. The techniques described with reference to FIG. 4 may enable developers or administrative users of the identity management platform 410 to dynamically enable or disable passkey authentication for clients of the identity management platform 410. For example, the described techniques may enable developers of the identity management platform 410 to control whether end users are presented with an option to setup and use a passkey when the end users attempt to access secured resources associated with a client of the identity management platform 410. Moreover, the identity management platform 410 may selectively display the option to devices that are capable of using passkey integration, which may reduce the likelihood of compatibility issues, errors, etc.

Figure 5:
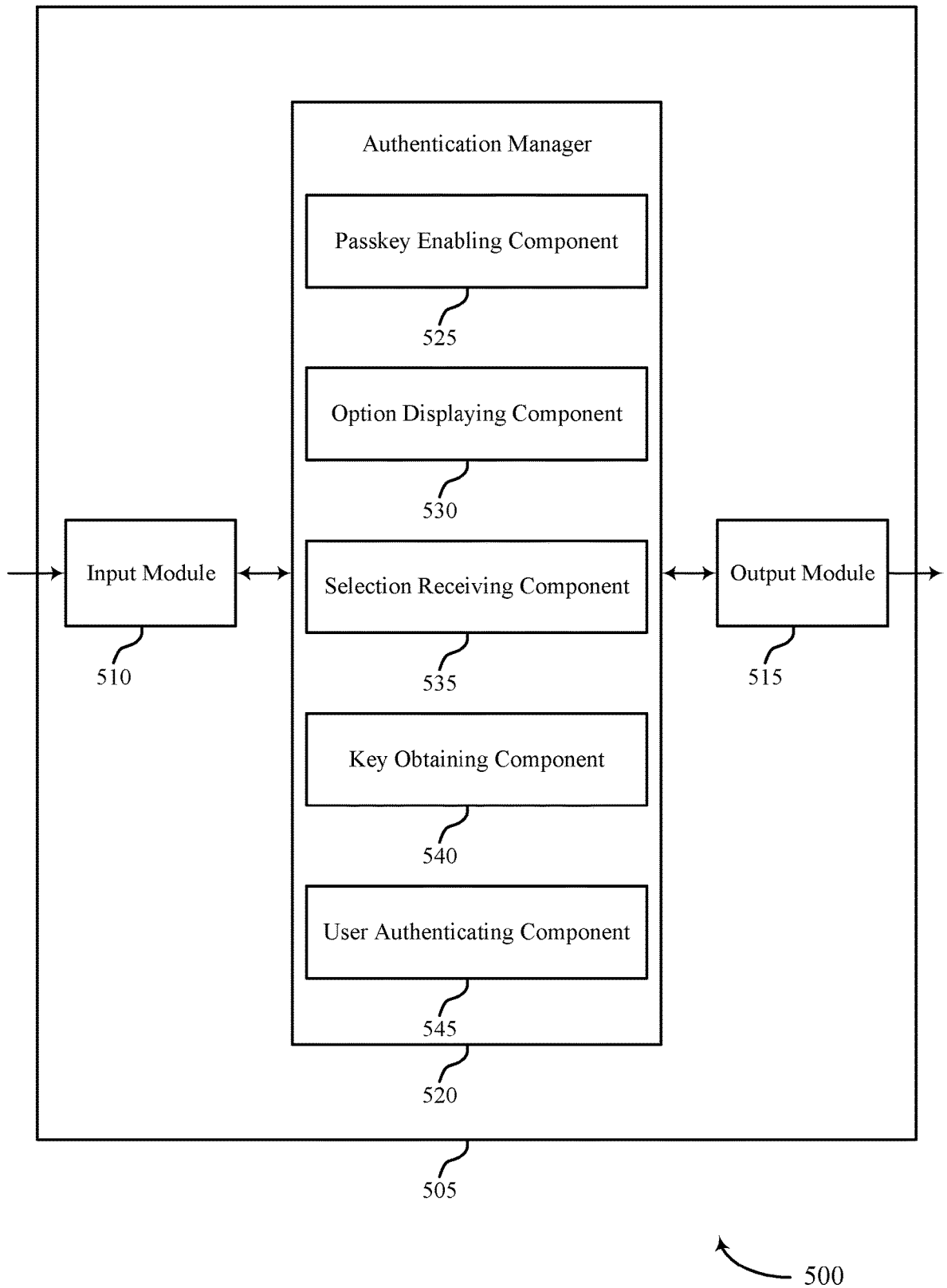
FIG. 5 shows a block diagram of an apparatus that supports passkey integration techniques for identity management in accordance with one or more aspects of the present disclosure.

FIG. 5 shows a block diagram 500 of a device 505 that supports passkey integration techniques for identity management in accordance with one or more aspects of the present disclosure. The device 505 may include an input module 510, an output module 515, and an authentication manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the authentication manager 520 to support passkey integration techniques for identity management. In some cases, the input module 510 may be a component of an input/output (I/O) controller 710, as described with reference to FIG. 7.

The output module 515 may manage output signals for the device 505. For example, the output module 515 may receive signals from other components of the device 505, such as the authentication manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710, as described with reference to FIG. 7.

For example, the authentication manager 520 may include a passkey enabling component 525, an option displaying component 530, a selection receiving component 535, a key obtaining component 540, a user authenticating component 545, or any combination thereof. In some examples, the authentication manager 520, or various components thereof, may be configured to perform various operations (e.g., receiving, monitoring, transmitting) using or otherwise in cooperation with the input module 510, the output module 515, or both. For example, the authentication manager 520 may receive information from the input module 510, send information to the output module 515, or be integrated in combination with the input module 510, the output module 515, or both to receive information, transmit information, or perform various other operations as described herein.

The authentication manager 520 may support passkey authentication at an identity management platform in accordance with examples disclosed herein. The passkey enabling component 525 may be configured as or otherwise support a means for receiving, from an administrator of the identity management platform via a first user interface configured for the identity management platform, an indication to enable passkey authentication for clients of the identity management platform. The option displaying component 530 may be configured as or otherwise support a means for transmitting, for display at a second user interface configured for a client of the identity management platform and based on enabling the passkey authentication, an option to use the passkey authentication for login procedures. The selection receiving component 535 may be configured as or otherwise support a means for receiving, from a user associated with the client via the second user interface, a selection of the option to use the passkey authentication for a login procedure. The key obtaining component 540 may be configured as or otherwise support a means for obtaining a public key for the user in response to the user selecting the option to use the passkey authentication for the login procedure. The user authenticating component 545 may be configured as or otherwise support a means for performing the login procedure using at least the public key to authenticate an identity of the user.

Figure 6:
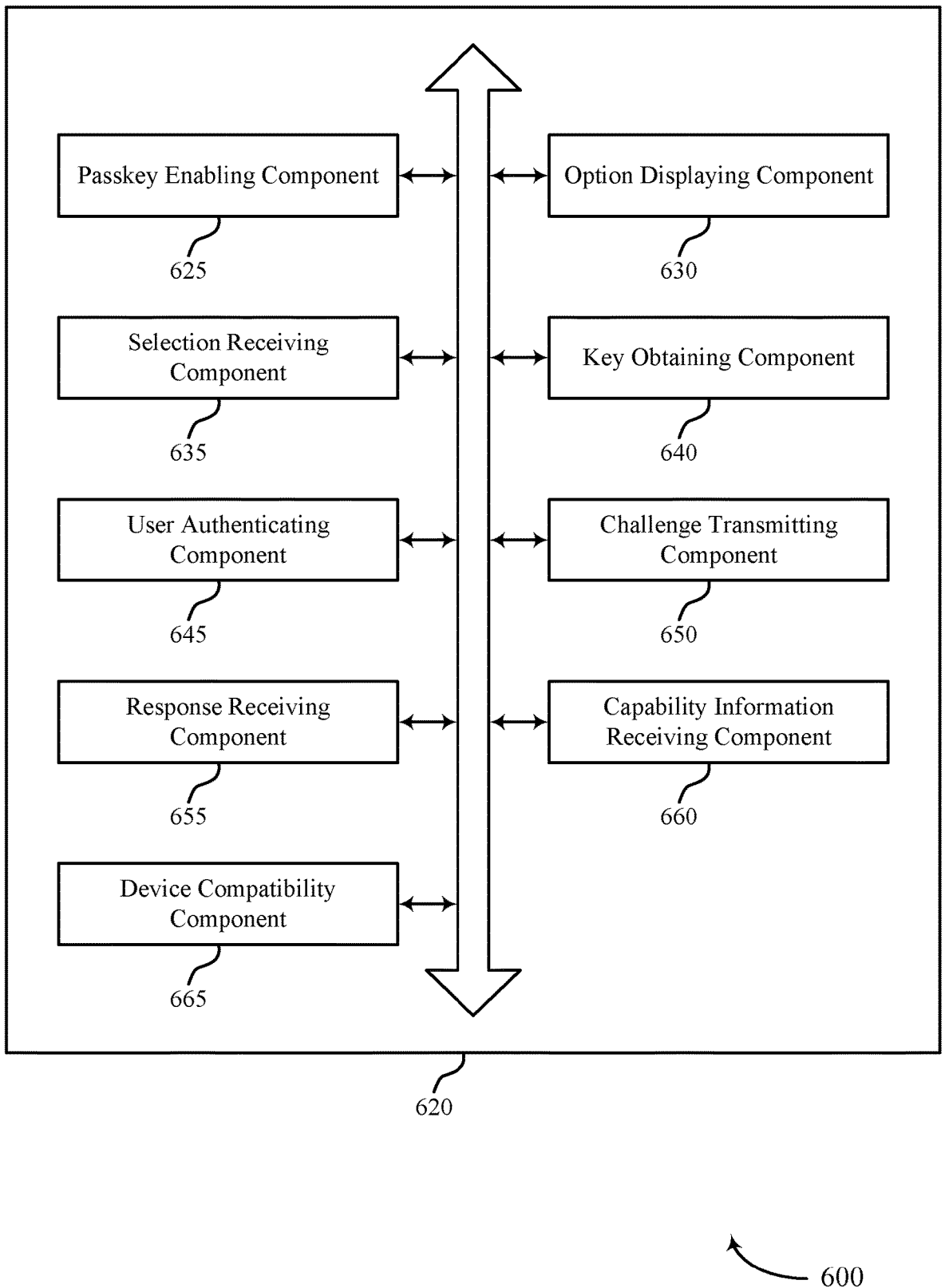
FIG. 6 shows a block diagram of an authentication manager that supports passkey integration techniques for identity management in accordance with one or more aspects of the present disclosure.

FIG. 6 shows a block diagram 600 of an authentication manager 620 that supports passkey integration techniques for identity management in accordance with one or more aspects of the present disclosure. The authentication manager 620 may be an example of aspects of an authentication manager 520, as described with reference to FIG. 5. The authentication manager 620, or various components thereof, may be an example of means for performing various aspects of passkey integration techniques for identity management as described herein. For example, the authentication manager 620 may include a passkey enabling component 625, an option displaying component 630, a selection receiving component 635, a key obtaining component 640, a user authenticating component 645, a challenge transmitting component 650, a response receiving component 655, a capability information receiving component 660, a device compatibility component 665, or any combination thereof. Each of these components may communicate, directly or indirectly, with one another (e.g., via one or more buses).

The authentication manager 620 may support passkey authentication at an identity management platform in accordance with examples disclosed herein. The passkey enabling component 625 may be configured as or otherwise support a means for receiving, from an administrator of the identity management platform via a first user interface configured for the identity management platform, an indication to enable passkey authentication for clients of the identity management platform. The option displaying component 630 may be configured as or otherwise support a means for transmitting, for display at a second user interface configured for a client of the identity management platform and based on enabling the passkey authentication, an option to use the passkey authentication for login procedures. The selection receiving component 635 may be configured as or otherwise support a means for receiving, from a user associated with the client via the second user interface, a selection of the option to use the passkey authentication for a login procedure. The key obtaining component 640 may be configured as or otherwise support a means for obtaining a public key for the user in response to the user selecting the option to use the passkey authentication for the login procedure. The user authenticating component 645 may be configured as or otherwise support a means for performing the login procedure using at least the public key to authenticate an identity of the user.

In some examples, to support performing the login procedure, the challenge transmitting component 650 may be configured as or otherwise support a means for transmitting an indication of a cryptographic challenge to a device associated with the user. In some examples, to support performing the login procedure, the response receiving component 655 may be configured as or otherwise support a means for receiving an indication of a cryptographic response from the device in response to the cryptographic challenge, where the cryptographic response includes a digital signature. In some examples, to support performing the login procedure, the user authenticating component 645 may be configured as or otherwise support a means for authenticating the user based on using the public key to verify the digital signature in the cryptographic response.

In some examples, the user authenticating component 645 may be configured as or otherwise support a means for determining that the device has access to a private key associated with the user based on the digital signature in the cryptographic response, where authenticating the user is based on determining that the device has access to the private key.

In some examples, the private key is locally unlocked on the device after the user successfully performs a facial recognition procedure, a voice recognition procedure, a fingerprint recognition procedure, a personal identification number verification procedure, a security key verification procedure, or a combination thereof. In some examples, the private key is generated and stored at the device after the user selects the option to use the passkey authentication for the login procedure.

In some examples, the key obtaining component 640 may be configured as or otherwise support a means for receiving an indication that the user has registered the public key with the client of the identity management platform, where obtaining the public key for the user is based on the indication.

In some examples, to support receiving the selection of the option to use the passkey authentication, the selection receiving component 635 may be configured as or otherwise support a means for receiving the selection via a web browser executing on a device associated with the user, where the public key of the user is stored at the identity management platform in association with the user, the web browser, the device, an operating system of the device, or a combination thereof.

In some examples, the capability information receiving component 660 may be configured as or otherwise support a means for receiving, via a web browser executing on a device associated with the user, an indication of capability information associated with the device. In some examples, the device compatibility component 665 may be configured as or otherwise support a means for determining that the device supports the passkey authentication based on the capability information, where displaying the option to use the passkey authentication for the login procedure is based on determining that the device supports the passkey authentication. In some examples, the capability information is received via a web browser executing on the device of the user.

In some examples, the key obtaining component 640 may be configured as or otherwise support a means for storing the public key at the identity management platform in association with an identifier of the user, a password of the user, an account number associated with the user, or a combination thereof, where the public key is retrieved from the identity management platform after the user initiates the login procedure.

In some examples, to support receiving the indication to enable the passkey authentication, the passkey enabling component 625 may be configured as or otherwise support a means for enabling the passkey authentication for the clients of the identity management platform in response to the administrator of the identity management platform selecting one or more user interface elements displayed in the first user interface. In some examples, the one or more user interface elements include a checkbox, a toggle switch, a dropdown list, a button, or a combination thereof.

In some examples, the passkey enabling component 625 may be configured as or otherwise support a means for configuring a passkey for the user based on performing one or more API calls to a web authentication service, where the passkey includes the public key and a corresponding private key associated with the user.

In some examples, to support displaying the option to use the passkey authentication, the option displaying component 630 may be configured as or otherwise support a means for transmitting, for display at the second user interface, a first option to use the passkey authentication for the login procedure and a second option to use other credentials for the login procedure, where the first option is selected by the user.

Figure 7:
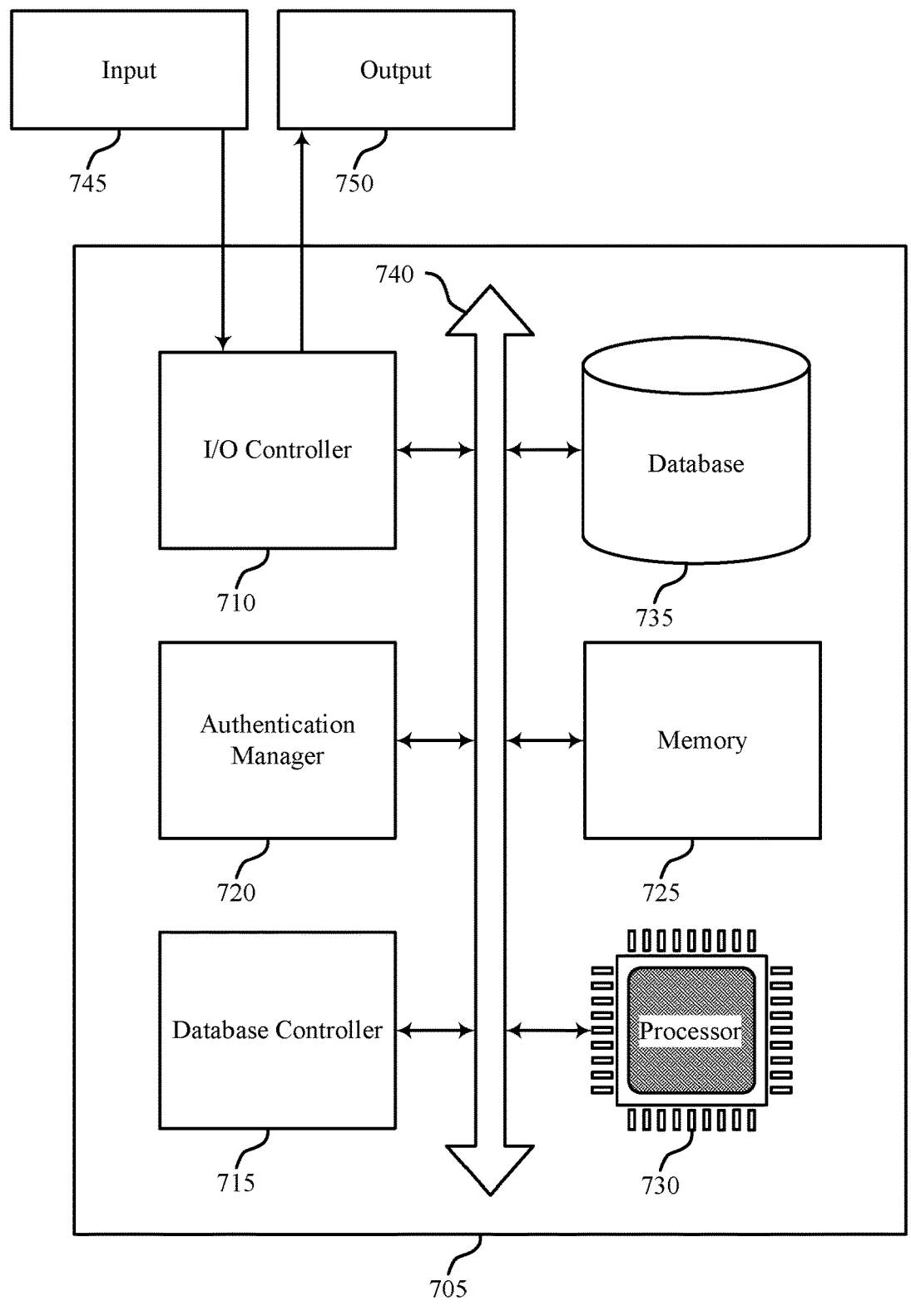
FIG. 7 shows a diagram of a system including a device that supports passkey integration techniques for identity management in accordance with one or more aspects of the present disclosure.

FIG. 7 shows a diagram of a system 700 including a device 705 that supports passkey integration techniques for identity management in accordance with one or more aspects of the present disclosure. The device 705 may be an example of or include the components of a device 505, as described herein with reference to FIG. 5. The device 705 may include various components for data communications, including components for transmitting and receiving communications, such as an authentication manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a basic I/O system (BIOS), which may control basic hardware or software operation such as the interaction with peripheral components or devices.

The processor 730 may include an intelligent hardware device, (e.g., a general-purpose processor, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting passkey integration techniques for identity management).

The authentication manager 720 may support passkey authentication at an identity management platform in accordance with examples disclosed herein. For example, the authentication manager 720 may be configured as or otherwise support a means for receiving, from an administrator of the identity management platform via a first user interface configured for the identity management platform, an indication to enable passkey authentication for clients of the identity management platform. The authentication manager 720 may be configured as or otherwise support a means for transmitting, for display at a second user interface configured for a client of the identity management platform and based on enabling the passkey authentication, an option to use the passkey authentication for login procedures. The authentication manager 720 may be configured as or otherwise support a means for receiving, from a user associated with the client via the second user interface, a selection of the option to use the passkey authentication for a login procedure. The authentication manager 720 may be configured as or otherwise support a means for obtaining a public key for the user in response to the user selecting the option to use the passkey authentication for the login procedure. The authentication manager 720 may be configured as or otherwise support a means for performing the login procedure using at least the public key to authenticate an identity of the user.

By including or configuring the authentication manager 720 in accordance with examples as described herein, the device 705 may support techniques for dynamically enabling or disabling passkey authentication for clients of an identity management platform. For example, a developer of the identity management platform may use the device 705 to control whether end users are presented with an option to setup and use a passkey when the end users attempt to access secured resources associated with a client of the identity management platform. Moreover, the identity management platform may selectively display the option to devices that are capable of using passkey integration, which may reduce the likelihood of compatibility issues, errors, etc.

Figure 8:
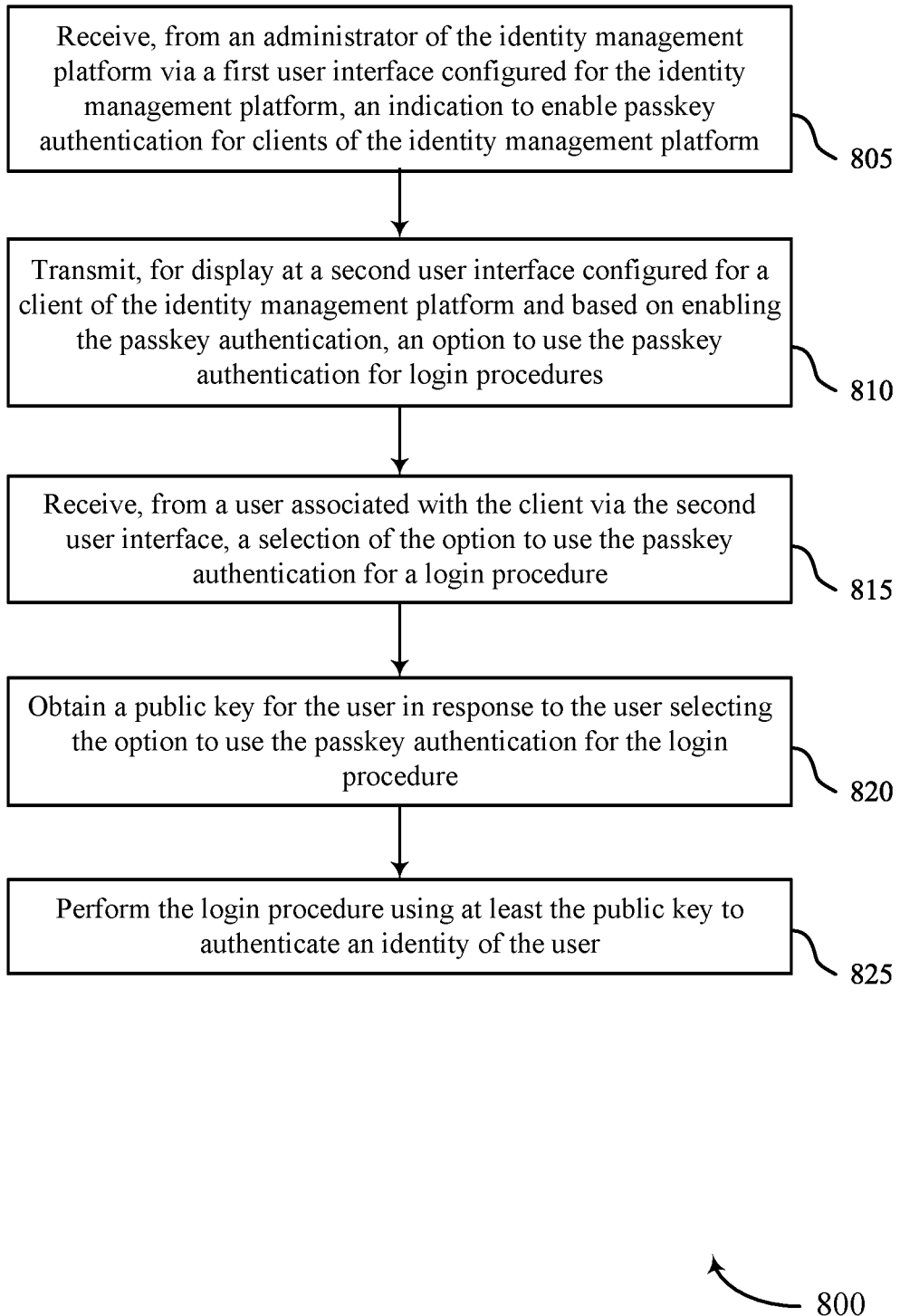
FIGS. 8 through 10 show flowcharts illustrating methods that support passkey integration techniques for identity management in accordance with one or more aspects of the present disclosure.

FIG. 8 shows a flowchart illustrating a method 800 that supports passkey integration techniques for identity management in accordance with one or more aspects of the present disclosure. The operations of the method 800 may be implemented by an identity management platform or components thereof. For example, the operations of the method 800 may be performed by an identity management platform 210, as described with reference to FIG. 2. In some examples, an identity management platform may execute a set of instructions to control the functional elements of the identity management platform to perform the operations of the method 800. Additionally, or alternatively, the identity management platform may perform aspects of the operations of the method 800 using special-purpose hardware.

At 805, the identity management platform may receive, from an administrator of the identity management platform via a first user interface configured for the identity management platform, an indication to enable passkey authentication for clients of the identity management platform. The operations of 805 may be performed in accordance with examples disclosed herein. In some examples, aspects of the operations of 805 may be performed by a passkey enabling component 625, as described with reference to FIG. 6.

At 810, the identity management platform may transmit, for display at a second user interface configured for a client of the identity management platform and based on enabling the passkey authentication, an option to use the passkey authentication for login procedures. The operations of 810 may be performed in accordance with examples disclosed herein. In some examples, aspects of the operations of 810 may be performed by an option displaying component 630, as described with reference to FIG. 6.

At 815, the identity management platform may receive, from a user associated with the client via the second user interface, a selection of the option to use the passkey authentication for a login procedure. The operations of 815 may be performed in accordance with examples disclosed herein. In some examples, aspects of the operations of 815 may be performed by a selection receiving component 635, as described with reference to FIG. 6.

At 820, the identity management platform may obtain a public key for the user in response to the user selecting the option to use the passkey authentication for the login procedure. The operations of 820 may be performed in accordance with examples disclosed herein. In some examples, aspects of the operations of 820 may be performed by a key obtaining component 640, as described with reference to FIG. 6.

At 825, the identity management platform may perform the login procedure using at least the public key to authenticate an identity of the user. The operations of 825 may be performed in accordance with examples disclosed herein. In some examples, aspects of the operations of 825 may be performed by a user authenticating component 645, as described with reference to FIG. 6.

Figure 9:
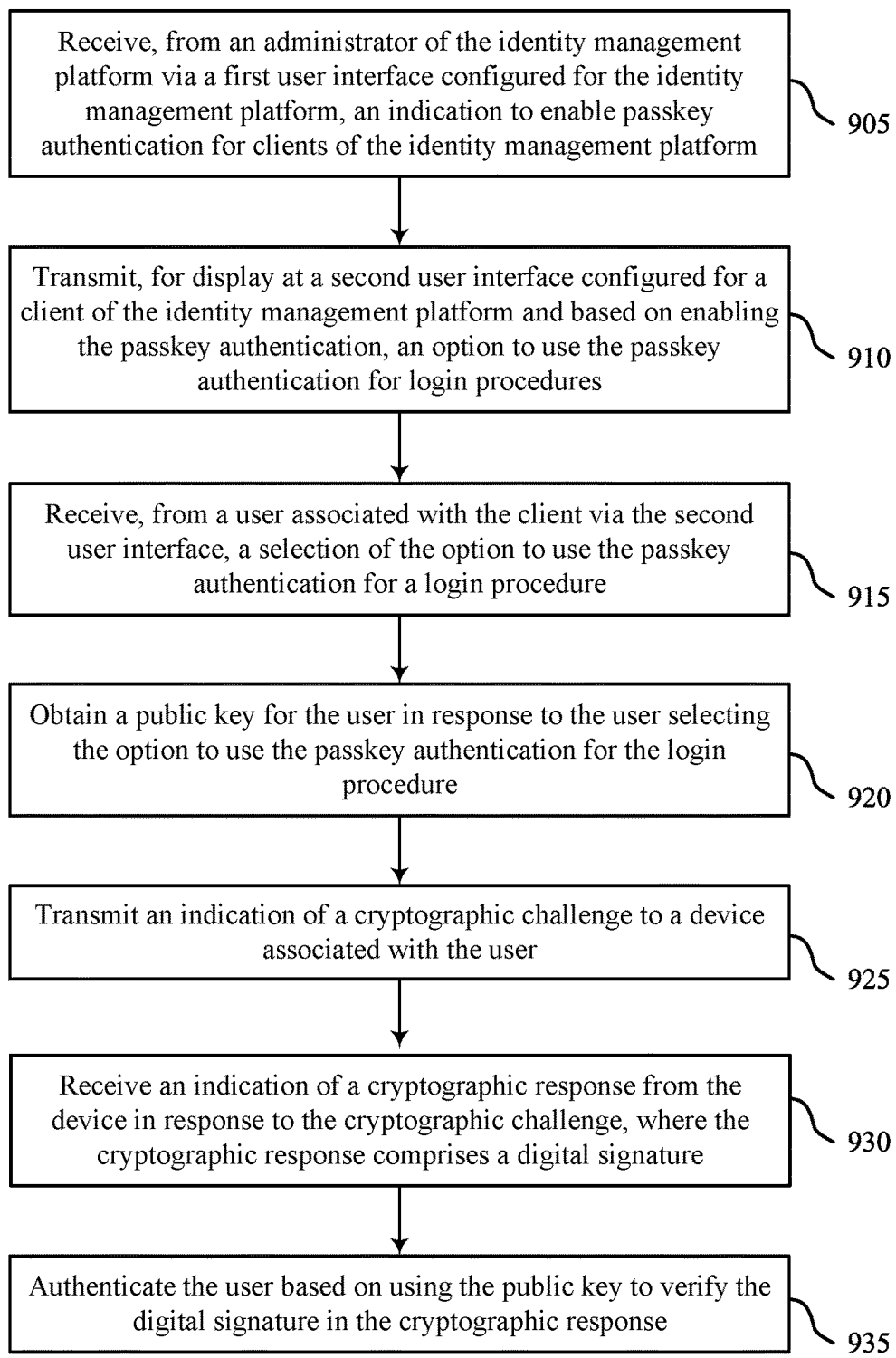

FIG. 9 shows a flowchart illustrating a method 900 that supports passkey integration techniques for identity management in accordance with one or more aspects of the present disclosure. The operations of the method 900 may be implemented by an identity management platform or components thereof. For example, the operations of the method 900 may be performed by an identity management platform 310, as described with reference to FIG. 3. In some examples, an identity management platform may execute a set of instructions to control the functional elements of the identity management platform to perform the operations of the method 900. Additionally, or alternatively, the identity management platform may perform aspects of the operations of the method 900 using special-purpose hardware.

At 905, the identity management platform may receive, from an administrator of the identity management platform via a first user interface configured for the identity management platform, an indication to enable passkey authentication for clients of the identity management platform. The operations of 905 may be performed in accordance with examples disclosed herein. In some examples, aspects of the operations of 905 may be performed by a passkey enabling component 625, as described with reference to FIG. 6.

At 910, the identity management platform may transmit, for display at a second user interface configured for a client of the identity management platform and based on enabling the passkey authentication, an option to use the passkey authentication for login procedures. The operations of 910 may be performed in accordance with examples disclosed herein. In some examples, aspects of the operations of 910 may be performed by an option displaying component 630, as described with reference to FIG. 6.

At 915, the identity management platform may receive, from a user associated with the client via the second user interface, a selection of the option to use the passkey authentication for a login procedure. The operations of 915 may be performed in accordance with examples disclosed herein. In some examples, aspects of the operations of 915 may be performed by a selection receiving component 635, as described with reference to FIG. 6.

At 920, the identity management platform may obtain a public key for the user in response to the user selecting the option to use the passkey authentication for the login procedure. The operations of 920 may be performed in accordance with examples disclosed herein. In some examples, aspects of the operations of 920 may be performed by a key obtaining component 640, as described with reference to FIG. 6.

At 925, the identity management platform may transmit an indication of a cryptographic challenge to a device associated with the user. The operations of 925 may be performed in accordance with examples disclosed herein. In some examples, aspects of the operations of 925 may be performed by a challenge transmitting component 650, as described with reference to FIG. 6.

At 930, the identity management platform may receive an indication of a cryptographic response from the device in response to the cryptographic challenge, where the cryptographic response includes a digital signature. The operations of 930 may be performed in accordance with examples disclosed herein. In some examples, aspects of the operations of 930 may be performed by a response receiving component 655, as described with reference to FIG. 6.

At 935, the identity management platform may authenticate the user based on using the public key to verify the digital signature in the cryptographic response. The operations of 935 may be performed in accordance with examples disclosed herein. In some examples, aspects of the operations of 935 may be performed by a user authenticating component 645, as described with reference to FIG. 6.

Figure 10:
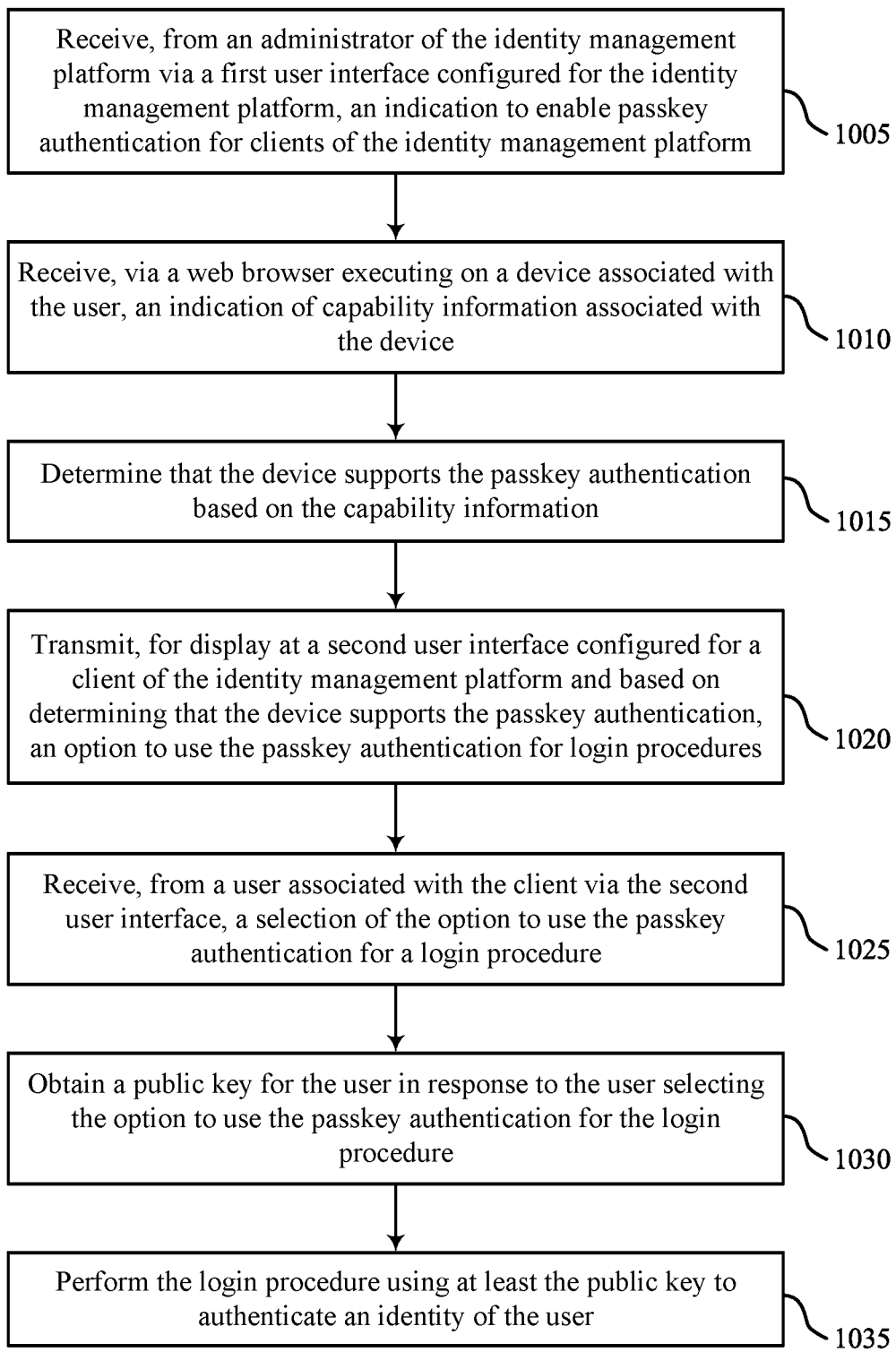

FIG. 10 shows a flowchart illustrating a method 1000 that supports passkey integration techniques for identity management in accordance with one or more aspects of the present disclosure. The operations of the method 1000 may be implemented by an identity management platform or components thereof. For example, the operations of the method 1000 may be performed by an identity management platform 410, as described with reference to FIG. 4. In some examples, an identity management platform may execute a set of instructions to control the functional elements of the identity management platform to perform the operations of the method 1000. Additionally, or alternatively, the identity management platform may perform aspects of the operations of the method 1000 using special-purpose hardware.

At 1005, the identity management platform may receive, from an administrator of the identity management platform via a first user interface configured for the identity management platform, an indication to enable passkey authentication for clients of the identity management platform. The operations of 1005 may be performed in accordance with examples disclosed herein. In some examples, aspects of the operations of 1005 may be performed by a passkey enabling component 625, as described with reference to FIG. 6.

At 1010, the identity management platform may receive, via a web browser executing on a device associated with the user, an indication of capability information associated with the device. The operations of 1010 may be performed in accordance with examples disclosed herein. In some examples, aspects of the operations of 1010 may be performed by a capability information receiving component 660, as described with reference to FIG. 6.

At 1015, the identity management platform may determine that the device supports the passkey authentication based on the capability information. The operations of 1015 may be performed in accordance with examples disclosed herein. In some examples, aspects of the operations of 1015 may be performed by a device compatibility component 665, as described with reference to FIG. 6.

At 1020, the identity management platform may transmit, for display at a second user interface configured for a client of the identity management platform and based on determining that the device supports the passkey authentication, an option to use the passkey authentication for login procedures. The operations of 1020 may be performed in accordance with examples disclosed herein. In some examples, aspects of the operations of 1020 may be performed by an option displaying component 630, as described with reference to FIG. 6.

At 1025, the identity management platform may receive, from a user associated with the client via the second user interface, a selection of the option to use the passkey authentication for a login procedure. The operations of 1025 may be performed in accordance with examples disclosed herein. In some examples, aspects of the operations of 1025 may be performed by a selection receiving component 635, as described with reference to FIG. 6.

At 1030, the identity management platform may obtain a public key for the user in response to the user selecting the option to use the passkey authentication for the login procedure. The operations of 1030 may be performed in accordance with examples disclosed herein. In some examples, aspects of the operations of 1030 may be performed by a key obtaining component 640, as described with reference to FIG. 6.

At 1035, the identity management platform may perform the login procedure using at least the public key to authenticate an identity of the user. The operations of 1035 may be performed in accordance with examples disclosed herein. In some examples, aspects of the operations of 1035 may be performed by a user authenticating component 645, as described with reference to FIG. 6.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for passkey authentication at an identity management platform, comprising:
    receiving, from an administrator of the identity management platform via a first user interface configured for the identity management platform, an indication to enable passkey authentication for clients of the identity management platform;
    receiving, via a web browser executing on a device associated with a user of the identity management platform, capability information associated with the device that indicates whether the device is capable of using passkey authentication;
    transmitting, for display at a second user interface configured for a client of the identity management platform associated with the user and based at least in part on enabling the passkey authentication, an option to use the passkey authentication for login procedures, wherein displaying the option to use the passkey authentication for the login procedures is in response to the received capability information indicating that the device is capable of using passkey authentication;
    receiving, from the user associated with the client via the second user interface, a selection of the option to use the passkey authentication for a login procedure;
    obtaining a public key for the user in response to the user selecting the option to use the passkey authentication for the login procedure; and
    performing the login procedure using at least the public key to authenticate an identity of the user.

2. The method of claim 1, wherein performing the login procedure comprises:
    transmitting an indication of a cryptographic challenge to a device associated with the user;
    receiving an indication of a cryptographic response from the device in response to the cryptographic challenge, wherein the cryptographic response comprises a digital signature; and
    authenticating the user based at least in part on using the public key to verify the digital signature in the cryptographic response.

3. The method of claim 2, further comprising:
    determining that the device has access to a private key associated with the user based at least in part on the digital signature in the cryptographic response, wherein authenticating the user is based at least in part on determining that the device has access to the private key.

4. The method of claim 3, wherein the private key is locally unlocked on the device after the user successfully performs a facial recognition procedure, a voice recognition procedure, a fingerprint recognition procedure, a personal identification number verification procedure, a security key verification procedure, or a combination thereof.

5. The method of claim 3, wherein the private key is generated and stored at the device after the user selects the option to use the passkey authentication for the login procedure.

6. The method of claim 1, further comprising:
receiving an indication that the user has registered the public key with the client of the identity management platform, wherein obtaining the public key for the user is based at least in part on the indication.

7. The method of claim 1, wherein receiving the selection of the option to use the passkey authentication comprises:
receiving the selection via a web browser executing on a device associated with the user, wherein the public key of the user is stored at the identity management platform in association with the user, the web browser, the device, an operating system of the device, or a combination thereof.

8. The method of claim 1, further comprising:
storing the public key at the identity management platform in association with an identifier of the user, a password of the user, an account number associated with the user, or a combination thereof, wherein the public key is retrieved from the identity management platform after the user initiates the login procedure.

9. The method of claim 1, wherein receiving the indication to enable the passkey authentication comprises:
enabling the passkey authentication for the clients of the identity management platform in response to the administrator of the identity management platform selecting one or more user interface elements displayed in the first user interface.

10. The method of claim 9, wherein the one or more user interface elements comprise a checkbox, a toggle switch, a dropdown list, a button, or a combination thereof.

11. The method of claim 1, further comprising:
configuring a passkey for the user based at least in part on performing one or more application programming interface calls to a web authentication service, wherein the passkey comprises the public key and a corresponding private key associated with the user.

12. The method of claim 1, wherein displaying the option to use the passkey authentication comprises:
transmitting, for display at the second user interface, a first option to use the passkey authentication for the login procedure and a second option to use other credentials for the login procedure, wherein the first option is selected by the user.

13. An apparatus for passkey authentication at an identity management platform, comprising:
a processor;
memory coupled with the processor; and
instructions stored in the memory, wherein the instructions are executable by the processor to cause the apparatus to:
receive, from an administrator of the identity management platform via a first user interface configured for the identity management platform, an indication to enable passkey authentication for clients of the identity management platform;
receive, via a web browser executing on a device associated with a user of the identity management platform, capability information associated with the device that indicates whether the device is capable of using passkey authentication;
transmit, for display at a second user interface configured for a client of the identity management platform associated with the user and based at least in part on enabling the passkey authentication, an option to use the passkey authentication for login procedures, wherein displaying the option to use the passkey authentication for the login procedures is in response to the received capability information indicating that the device is capable of using passkey authentication;
receive, from the user associated with the client via the second user interface, a selection of the option to use the passkey authentication for a login procedure;
obtain a public key for the user in response to the user selecting the option to use the passkey authentication for the login procedure; and
perform the login procedure using at least the public key to authenticate an identity of the user.

14. The apparatus of claim 13, wherein the instructions to perform the login procedure are executable by the processor to cause the apparatus to:
transmit an indication of a cryptographic challenge to a device associated with the user;
receive an indication of a cryptographic response from the device in response to the cryptographic challenge, wherein the cryptographic response comprises a digital signature; and
authenticate the user based at least in part on using the public key to verify the digital signature in the cryptographic response.

15. The apparatus of claim 13, wherein the instructions are further executable by the processor to cause the apparatus to:
store the public key at the identity management platform in association with an identifier of the user, a password of the user, an account number associated with the user, or a combination thereof, wherein the public key is retrieved from the identity management platform after the user initiates the login procedure.

16. A non-transitory computer-readable medium storing code for passkey authentication at an identity management platform, the code comprising instructions that are executable by a processor to:
receive, from an administrator of the identity management platform via a first user interface configured for the identity management platform, an indication to enable passkey authentication for clients of the identity management platform;
receive, via a web browser executing on a device associated with a user of the identity management platform, capability information associated with the device that indicates whether the device is capable of using passkey authentication;
transmit, for display at a second user interface configured for a client of the identity management platform associated with the user and based at least in part on enabling the passkey authentication, an option to use the passkey authentication for login procedures, wherein displaying the option to use the passkey authentication for the login procedures is in response to the received capability information indicating that the device is capable of using passkey authentication;
receive, from the user associated with the client via the second user interface, a selection of the option to use the passkey authentication for a login procedure;
obtain a public key for the user in response to the user selecting the option to use the passkey authentication for the login procedure; and
perform the login procedure using at least the public key to authenticate an identity of the user.

17. The non-transitory computer-readable medium of claim 16, wherein the instructions to perform the login procedure are executable by the processor to:

transmit an indication of a cryptographic challenge to a device associated with the user;
receive an indication of a cryptographic response from the device in response to the cryptographic challenge, wherein the cryptographic response comprises a digital signature; and
authenticate the user based at least in part on using the public key to verify the digital signature in the cryptographic response.

* * * * *